United States Patent
Knossalla et al.

(10) Patent No.: US 12,485,404 B2
(45) Date of Patent: Dec. 2, 2025

(54) PROCESS FOR PRODUCING AN OLIGOMERIZATION CATALYST HAVING A HYDROTHERMAL TREATMENT STEP

(71) Applicant: Evonik Oxeno GmbH & Co. KG, Marl (DE)

(72) Inventors: Johannes Knossalla, Gahlen (DE); Thomas Quandt, Marl (DE); Robert Franke, Marl (DE)

(73) Assignee: Evonik Oxeno GmbH & Co. KG, Marl (DE)

( * ) Notice: Subject to any disclaimer, the term of this patent is extended or adjusted under 35 U.S.C. 154(b) by 426 days.

(21) Appl. No.: 18/063,072

(22) Filed: Dec. 7, 2022

(65) Prior Publication Data
US 2023/0173467 A1    Jun. 8, 2023

(30) Foreign Application Priority Data
Dec. 8, 2021    (EP) .................... 21213152

(51) Int. Cl.
| | | |
|---|---|---|
| *B01J 23/755* | (2006.01) | |
| *B01J 21/12* | (2006.01) | |
| *B01J 35/37* | (2024.01) | |
| *B01J 37/00* | (2006.01) | |
| *B01J 37/02* | (2006.01) | |
| *B01J 37/03* | (2006.01) | |
| *B01J 37/04* | (2006.01) | |
| *B01J 37/08* | (2006.01) | |
| *C07C 2/58* | (2006.01) | |

(52) U.S. Cl.
CPC ............ *B01J 23/755* (2013.01); *B01J 21/12* (2013.01); *B01J 37/0018* (2013.01); *B01J 37/0063* (2013.01); *B01J 37/0236* (2013.01); *B01J 37/031* (2013.01); *B01J 37/04* (2013.01); *B01J 37/088* (2013.01); *C07C 2/58* (2013.01); *B01J 35/37* (2024.01); *C07C 2523/755* (2013.01)

(58) Field of Classification Search
USPC ...................................................... 502/259
See application file for complete search history.

(56) References Cited

U.S. PATENT DOCUMENTS

| | | | |
|---|---|---|---|
| 10,633,302 B2 | 4/2020 | Nadolny et al. | |
| 10,850,261 B2 | 12/2020 | Nadolny et al. | |
| 11,253,844 B2 | 2/2022 | Nadolny et al. | |
| 2011/0152596 A1* | 6/2011 | Zanthoff | B01J 21/12 |
| | | | 585/640 |
| 2019/0283003 A1 | 9/2019 | Nadolny et al. | |
| 2019/0283004 A1 | 9/2019 | Nadolny et al. | |
| 2019/0283005 A1 | 9/2019 | Nadolny et al. | |
| 2019/0283006 A1* | 9/2019 | Nadolny | B01J 37/0201 |
| 2021/0154654 A1* | 5/2021 | Boualleg | B01J 37/0205 |

FOREIGN PATENT DOCUMENTS

| | | |
|---|---|---|
| EP | 3542898 | 9/2019 |
| KR | 10-1444600 B | 9/2014 |

OTHER PUBLICATIONS

Menart ("The Role of Acidity in Heterogeneous Nickel Catalysts for the Oligomerization of Light Olefins", Ph. D. thesis, 2018) (Year: 2018).*
Klobes, et. al. ("Porosity and Specific Surface Area Measurements for Solid Materials", NIST publication, 2006) (Year: 2006).*
Micromeritics (ASAP 2020 Operator's Manual, Feb. 2019). (Year: 2019).*
U.S. Pat. No. 10,850,261, filed Dec. 1, 2020, 2019/0283003, Nadolny et al.
U.S. Pat. No. 11,253,844, filed Feb. 22, 2022, 2019/0283004, Nadolny et al.
European Search Report dated Apr. 17, 2023, in European Application No. 22211067.8, 7 pages.
European Search Report dated May 18, 2022, in European Application No. 21213152.8, 7 pages.
Lallemand, et al, "Catalytic oligomerization of ethylene over Ni-containing dealuminated Y zeolites", Applied Catalysis A: General 301, 2006, 196-201.

* cited by examiner

*Primary Examiner* — Christina A Johnson
(74) *Attorney, Agent, or Firm* — Grüneberg and Myers PLLC

(57) ABSTRACT

A process for producing an oligomerization catalyst includes hydrothermal treatment. An oligomerization catalyst produced by the process is useful for the oligomerization of $C_2$ to $C_{12}$ olefins.

20 Claims, No Drawings

PROCESS FOR PRODUCING AN OLIGOMERIZATION CATALYST HAVING A HYDROTHERMAL TREATMENT STEP

CROSS-REFERENCE TO RELATED APPLICATIONS

This application claims priority to European Application No. 21213152.8, filed on Dec. 8, 2021, the content of which is hereby incorporated by reference in its entirety.

BACKGROUND OF THE INVENTION

Field of the Invention

The invention relates to a process for producing an oligomerization catalyst that includes a step of hydrothermal treatment. The present invention relates also to an oligomerization catalyst produced by the process and to the use thereof in the oligomerization of $C_2$ to $C_{12}$ olefins.

Description of Related Art

Oligomerization is generally understood as meaning the reaction of unsaturated hydrocarbons with themselves to form correspondingly longer-chain hydrocarbons, so-called oligomers. For instance, an olefin having six carbon atoms (hexene) can be formed by oligomerization of two olefins having three carbon atoms. The oligomerization of two molecules with one another is also referred to as dimerization. The resulting oligomers are intermediates that are used, for example, for producing aldehydes, carboxylic acids and alcohols. The oligomerization of olefins is carried out on a large industrial scale either in the homogeneous phase using a dissolved catalyst or heterogeneously over a solid catalyst, or else with a two-phase catalyst system.

In the case of heterogeneously catalysed processes, oligomerization over acidic oligomerization catalysts has long been known. Systems employed industrially use for example zeolites or phosphoric acid on a support. Isomeric mixtures of branched olefins are obtained here. For non-acidic, heterogeneously catalysed oligomerization of olefins with high dimer selectivity, nickel compounds on a support, for example aluminium silicate, are frequently employed in industry, for example in EP 3 542 898 A1.

Various processes for the production of oligomerization catalysts are known in the prior art. An essential element of the production process is intimate mixing of a nickel source and an aluminium silicate. The further forming of such a mixture can be accomplished by means of a wide variety of methods known in the art. The mixture can initially be processed into a powder, which is then formed by means of methods known to those skilled in the art, for example extrusion, pelletization, compaction, tableting, spray granulation, or applied to an existing formed body, for example by coating. Alternatively, the mixture can be compressed directly by suitable methods, for example granulation or kneading, and transformed into formed bodies by means of known methods such as granulation, extrusion or pelletization.

EP 3 542 898 A1 discloses for example a process for producing an oligomerization catalyst in which the corresponding individual components are mixed and granulated and the granulated mixture then loaded with nickel by impregnation. Subsequent drying and calcining produces the final catalyst. With the processes for producing a catalyst that are known from the prior art, there can however be problems with the strength of the catalyst when used as intended. With oligomerization catalysts there is in addition a constant desire to improve catalyst properties, for example catalyst performance.

SUMMARY OF THE INVENTION

It was an object of the present invention to provide a process for producing an oligomerization catalyst having improved properties. Such an oligomerization catalyst should, by comparison with known systems, exhibit in particular increased strength and improved catalyst performance.

It has now surprisingly been found that the object is achieved with a process for producing an oligomerization catalyst in which an additional hydrothermal treatment takes place before the drying step. The hydrothermal treatment is according to the invention understood as meaning a step in which a wet material (mixture having a certain liquid component) is before the actual drying and subsequent calcining exposed to an elevated temperature (T>room temperature), wherein the water content and the optional ammonia content remains at a high level for a certain time and is reduced less substantially than during drying. The process according to the invention is therefore a process for producing a nickel-containing oligomerization catalyst that comprises the following steps:

a) producing a mixture comprising amorphous or zeolitic aluminium silicate that comprises 10% to 65% by weight of aluminium oxide and 35% to 90% by weight of silicon dioxide, optionally an Al-containing and Si-free binder or an Al-free and Si-containing binder, a nickel source that comprises a nickel compound, and water, wherein the liquid component in the mixture is not more than 1.5 times the TPV (total pore volume) of the aluminium silicate and of the optional binder, preferably not more than 1.3 times the TPV, more preferably not more than 1.25 times the TPV, the TPV being determined by nitrogen adsorption in accordance with DIN 66134;

b) subjecting the mixture thus produced to a hydrothermal treatment, the hydrothermal treatment taking place at a temperature within a range from 75° C. to 180° C., preferably 80° C. to 150° C.;

c) drying of the mixture obtained in step b), the drying rate in step c) being higher than in step b);

d) calcining the mixture dried in step c) to produce the oligomerization catalyst.

The invention also includes the following embodiments:
1. Process for producing a nickel-containing oligomerization catalyst, the process comprising the following steps:

a) producing a mixture comprising amorphous aluminium silicate that comprises 1% to 45% by weight of aluminium oxide and 55% to 99% by weight of silicon dioxide, optionally an Al-containing and Si-free or Al-free and Si-containing binder, a nickel source that comprises a nickel compound, and water, wherein the liquid component in the mixture is not more than 1.5 times the TPV (total pore volume) of the aluminium silicate and of the optional binder, preferably not more than 1.3 times the TPV, more preferably not more than 1.25 times the TPV, the TPV being determined by nitrogen adsorption in accordance with DIN 66134;

b) subjecting the mixture thus produced to a hydrothermal treatment, the thermal treatment taking place at a temperature in the range from 75° C. to 180° C., preferably 80° C. to 150° C.;

c) drying the mixture obtained in step b), the drying rate in step c) being higher than in step b);

d) calcining the mixture dried in step c) to produce the oligomerization catalyst.

2. Process according to embodiment 1, wherein the nickel compound is selected from the group consisting of nickel nitrate ($Ni(NO_3)_2$), nickel acetate ($Ni(ac)_2$), nickel acetylacetonate ($Ni(acac)_2$), nickel sulfate ($NiSO_4$), nickel citrate or nickel carbonate ($NiCO_3$).

3. Process according to embodiment 1 or 2, wherein the mixture produced in step a) comprises ammonia and the ammonia is added in step a) as part of the nickel source or as an ammonia-water mixture.

4. Process according to embodiment 3, wherein an ammoniacal Ni(CO) solution is used as the nickel source.

5. Process according to any of the preceding embodiments, wherein in step a) an oxidic aluminium material is used as an Al-containing and Si-free binder or silicon dioxide as an Al-free and Si-containing binder.

6. Process according to any of the preceding embodiments, wherein in step a) aluminium oxide, aluminium hydroxide or aluminium oxide hydroxide is used as an Al-containing and Si-free binder.

7. Process according to any of the preceding embodiments, wherein the mixture produced in step a) is subjected to a forming, preferably to a granulation, to a tableting, to an extrusion or to a die pressing, before the hydrothermal treatment in step b).

8. Process according to any of the preceding embodiments, wherein the mixture subjected to a hydrothermal treatment in step b) is subjected to a forming, preferably to a granulation, to a tableting, to an extrusion or to a die pressing, before the drying in step c).

9. Process according to any of the preceding embodiments, wherein the duration of the hydrothermal treatment is in the range from one hour to 24 hours.

10. Process according to any of the preceding embodiments, wherein the hydrothermal treatment is carried out in an open or closed vessel.

11. Process according to any of the preceding embodiments, wherein the drying in step b) takes place at a temperature in the range from 80 to 250° C., preferably in the range from 100 to 220° C.

12. Process according to any of the preceding embodiments, wherein the drying in step c) is carried out such that the dried material obtained has a loss on drying (LOD) at 110° C. of not more than 10% by weight, preferably not more than 5% by weight.

13. Process according to any of the preceding embodiments, wherein the drying rate in step c) is twice as high as in step b).

14. Process according to any of the preceding embodiments, wherein the calcining in step c) is carried out at a temperature between 400° C. and 800° C.

15. Process according to any of the preceding embodiments, wherein the calcining in step c) is carried out in the air stream, in the nitrogen stream or in a combination thereof.

DETAILED DESCRIPTION OF THE INVENTION

In the first step a) the original mixture is produced, which comprises, in addition to the support material aluminium silicate, a nickel source and water. The mixture may additionally comprise ammonia. The mixture may also comprise a binder or other substances, for example other metal oxides. In a preferred embodiment of the present invention, the mixture produced in step a) comprises an Al-containing and Si-free binder or an Al-free and Si-containing binder.

In the production of the mixture in step a) it is important to take account of the liquid component of the mixture. This liquid component of the mixture must be not more than 1.5 times the TPV (total pore volume), preferably not more than 1.3 times the TPV, more preferably not more than 1.25 times the TPV. TPV means the total pore volume of aluminium silicate and of the optional binder in the mixture. The pore volume TPV may be determined for example by nitrogen adsorption in accordance with DIN 66134 (version of February 1998). No more than slightly more liquid (water and optionally ammonia) than is needed for saturation of the pores is to be added. The aim of production in step a) is thus to produce a wet mixture that still contains water from production. The wet mixture was thus not subjected to a drying. Examples of mixtures coming under the definition of a wet mixture are (wet) powders, granules or plastically deformable compounds. In accordance with the established definition, a plastically deformable compound is in the present case to be understood as meaning that the corresponding material undergoes lasting deformation after overcoming a yield point without the cohesion of the particles forming the compound being lost. It is preferable that a granulated material is produced in step a), i.e. the mixture undergoes granulation.

Step a) thus explicitly does not involve the production of a suspension, a slurry or a solution, all of which are definable by a markedly higher liquid component. There is therefore also no need for a separation step to separate off liquid, and no corresponding liquid waste is generated either. The remaining liquid (water and optionally ammonia) is removed to a sufficient extent no later than the drying in step c).

The aluminium silicate used for production of the mixture in step a) means silicate materials composed of aluminium, silicon and oxygen that are formed from $SiO_4$ and $AlO_4$ tetrahedra. Other common terms for aluminium silicates are for example alumosilicate, silica-alumina or aluminosilicate. The aluminium silicate used in the mixture in step a) may be an amorphous alumosilicate or a zeolitic alumosilicate. "Amorphous" means for the purposes of the present invention the property of a solid that results from the solid having no crystal structure, i.e. no long-range order. For the purposes of the present invention it is not however possible to rule out the possibility of amorphous aluminium silicate having small crystalline domains. Amorphous aluminium silicate is nevertheless not a crystalline material and thus not a zeolitic material.

The aluminium silicate contains according to the invention 10% to 65% by weight of aluminium oxide and 35% to 90% by weight of silicon dioxide, preferably 10% to 45% by weight of aluminium oxide and 55% to 90% by weight of silicon dioxide. The expression "% by weight" refers in the context of the present invention to the composition minus the loss on drying, which is stated in the case of commercially available products.

In one embodiment, the binder likewise employed in step a) may be an Al-containing and Si-free binder (Si-free means: <0.1% by weight of Si in the total composition of the binder). The Al-containing and Si-free binder is preferably an oxidic aluminium material, preferably aluminium oxide, aluminium hydroxide or aluminium oxide hydroxide, more preferably boehmite. The Al-containing and Si-free binder is present further preferably not in solid form but rather in dissolved form, more preferably as a colloidal solution. In a preferred embodiment, the solvent in which the Al-containing and Si-free binder, preferably aluminium oxide, aluminium hydroxide or aluminium oxide hydroxide, more preferably boehmite, is present in dissolved form, preferably as a colloidal solution, is a 1% by weight solution of nitric acid. The Al-containing and Si-free binder is present in the solution, preferably the colloidal solution, in an amount within a range from 10% to 25% by weight, preferably 12% to 20% by weight, more preferably 14% to 18% by weight.

In a further embodiment, the binder likewise employed in step a) may be an Al-free and Si-containing binder (Al-free means: <0.1% by weight of Al in the total composition of the binder). The Al-free and Si-containing binder is preferably silicon dioxide. The Al-free and Si-containing binder is present further preferably not in solid form but rather in the form of a colloidal dispersion, more preferably a silica sol. In a preferred embodiment, the solvent in which the Al-free and Si-containing binder, preferably the silicon dioxide, is dispersed is water. The Al-free and Si-containing binder, preferably the silicon dioxide, is present in the dispersion in an amount within a range from 7% to 50% by weight, preferably 12% to 42% by weight, more preferably 20% to 35% by weight. The average particle size of the Al-free and Si-containing binder, preferably of the silicon dioxide, may, particularly in the dispersion, be 5 to 20 nm, preferably 6 to 10 nm (can be determined by light scattering methods). The viscosity of the dispersion comprising the Al-free and Si-containing binder, preferably the silicon dioxide, may be within a range from 1 to 50 mPa·s, preferably 5 to 25 mPa·s. The dispersion comprising the Al-free and Si-containing binder, preferably the silicon dioxide, may further preferably have a pH within a range from 7 to 12, preferably 8 to 10. The density of the dispersion comprising the Al-free and Si-containing binder, preferably the silicon dioxide, is preferably 1 to 1.3 g/cm$^3$, more preferably 1.1 to 1.25 g/cm$^3$.

The nickel source in step a) may be a solution of a nickel compound. Basically, as nickel compound any soluble nickel compound may be used. Nicel compound includes nickel nitrate ($Ni(NO_3)_2$), nickel acetate ($Ni(ac)_2$), nickel acetylacetonate ($Ni(acac)_2$), nickel sulfate ($NiSO_4$), nickel citrate, and nickel carbonate ($NiCO_3$). Preference is given to nickel nitrate ($Ni(NO_3)_2$), nickel sulfate ($NiSO_4$) and nickel carbonate ($NiCO_3$). The nickel solution is an aqueous or ammoniacal solution, preferably an ammoniacal solution. An ammoniacal solution is in this context to be understood as meaning an aqueous solution to which has been added ammonia. The solution of a nickel compound may contain nickel in an amount within a range from 1% to 20% by weight, preferably 5% to 15% by weight, in each case based on the total weight of the solution. In a preferred embodiment, the nickel solution employed is an ammoniacal $Ni(CO_3)$ solution known as NiHAC solution (a nickel hexamine carbonate complex ($[Ni(NH_3)_6]CO_3$) forms in the solution), which has a nickel content within a range from 1% to 20% by weight, preferably 5% to 15% by weight.

In the production of the mixture in step a), water and optionally ammonia are also used. Water and the optional ammonia may in the production of the mixture each be added individually or as a mixture. However, it is also possible for binder and/or nickel source to be added in the form of an aqueous or ammoniacal solution in the production of the mixture and for further water and ammonia to be optionally added individually or as a mixture. In the process according to the present invention, no more liquid than is necessary to form the wet mixture need be added at any time.

In a particularly preferred embodiment of the present invention, in step a) a mixture comprising amorphous aluminium silicate that comprises 10% by weight to 65% by weight of aluminium oxide and 35% to 90% by weight of silicon dioxide, optionally an Al-containing and Si-free binder or an Al-free and Si-containing binder, and an ammoniacal $Ni(CO_3)$ solution as the nickel source, wherein the liquid component in the mixture is not more than 1.5 times the TPV (total pore volume) of the aluminium silicate and of the binder (if present), preferably not more than 1.3 times the TPV, more preferably not more than 1.25 times the TPV, is produced and granulated. The liquid component necessary for the granulation can in part be adjusted during the granulation by adding for example nickel solution, water or aqueous ammonia solution. If a higher nickel concentration is to be achieved, an additional nickel source may be added in solid form. The granulation gives rise to particles of varying size, the granulated particles according to the invention preferably being within a range from 0.5 to 5 mm. Particles outside this range may however also be generated. These may be recycled as recycling material, particles that after the granulation are too small being directly recycled to the granulation and particles that are too large being separated, ground and only then recycled to the granulation.

The production of the mixture in step a), after which the mixture is present in the form of a wet mixture on account of the liquid content, is followed in step b) by the performance of a hydrothermal treatment. The mixture produced according to the invention, which is still in the form of a wet mixture, may however also be subjected to prior forming. In this case the hydrothermal treatment is carried out on the mixture obtained from the forming. The hydrothermal treatment is according to the invention carried out at a temperature applied to the vessel within a range from 75° C. to 180° C., preferably 80° C. to 150° C., and may be carried out in an open or closed vessel. The temperature in the wet mixture preferably rises here to 70 to 110° C., preferably 75 to 95° C., The stated temperature relates to the wet mixture or the temperature present in the vessel. An open vessel in connection with the hydrothermal treatment is understood as meaning that the vessel is not tightly closed, but has an opening. Examples therefor would be valves or pressure-relief valves intended to prevent the vessel from bursting, or the at least partial covering of the opening with a semipermeable membrane. This can keep the drying rate low, but also prevents possibly forming overpressures which can for example be critical for the vessel.

The hydrothermal treatment is the core of the present process and must be clearly delimited from the subsequent drying in step c). In the hydrothermal treatment, the drying rate (loss in mass of water and optionally ammonia per unit time (e.g. min)) is significantly lower than in the drying in step c). This is achieved through suitable conditions and/or apparatuses, for example the type and construction of the vessel. The hydrothermal treatment in step b) may also take place in a closed vessel, in which case the drying rate relative to the volume of the vessel is zero or close to zero. If the hydrothermal treatment is carried out in a closed vessel, the evaporating water and optionally the evaporating ammonia result in a rise in pressure. For safety reasons it may be necessary in this case for the closed vessel to have a pressure relief valve to prevent the pressure from becoming too high.

The duration of the hydrothermal treatment does not necessarily need to be limited to a certain time. The hydrothermal treatment should at least result in establishment of the increase in strength desired according to the invention and in an increase in catalytic activity, which can be checked by appropriate measurement (see examples). On the other hand, in order to save energy and thus costs the hydrothermal treatment should if only for economic reasons not be carried out for too long. In a preferred embodiment it has proven advantageous when the duration of the hydrothermal treatment is within a range from one hour to 24 hours.

Although the hydrothermal treatment in step b) may be carried out in a closed vessel, it is also possible for the mixture from step a), after optional forming, to be subjected to a gas flow around or through it during the hydrothermal treatment. It is advantageous when the amount of gas flowing around or through the mixture from step a) during the thermal treatment after optional forming is limited. The space velocity of the gas flowing around or through the mixture per hour during the thermal treatment should preferably be less than 50 times the volume of the mixture.

The mixture produced according to the invention, which is still present in the form of a wet mixture, may be subjected to forming prior to drying. In this operation, the mixture can be brought into a form suitable for the oligomerization catalyst that is being produced, for example in the form of granules or in the form of tablets. Forming is however only optional, since it is in principle also possible to use the catalyst in the form of a powder. Thus, the mixture produced in step a) may be subjected to a forming, preferably to a granulation, to a tableting, to an extrusion or to a die pressing, more preferably to a granulation, before the hydrothermal treatment in step b). It is however also possible that the mixture subjected to a hydrothermal treatment in step b) is subjected to a forming, preferably to a granulation, to a tableting, to an extrusion or to a die pressing, more preferably to a granulation, but only before the drying in step c).

After the hydrothermal treatment in step b) or after forming, if this has not already been carried out prior to the hydrothermal treatment, the mixture respectively obtained is in step c) subjected to a drying. This may be done using known apparatuses such as suitable ovens or in continuous mode using for example belt dryers or the like. Corresponding apparatuses are known to those skilled in the art. The drying temperature may be within a range from 80° C. to 250° C., preferably within a range from 100° C. to 220° C. Unlike in the hydrothermal treatment, evaporation of the liquid (water and optionally ammonia) is necessary in the drying in step c). The drying rate is therefore higher than in the hydrothermal treatment in step b), preferably at least twice as high as in the hydrothermal treatment in step b).

In a preferred embodiment, the drying is carried out such that the dried material obtained has a loss on drying (LOD) at 110° C. of not more than 10% by weight, preferably not more than 5% by weight. The loss on drying at 110° C. is here determined as follows: The material sample under investigation is initially weighed (m[start weight]); the material sample is then dried in a drying oven at 110° C. for a period of 6 h, after which it is allowed to cool in a desiccator and then reweighed (m[end weight]); the loss on drying (LOD) at 110° C. is then calculated as follows:

LOD=100%*(m[start weight]−m[end weight])/m[start weight].

The drying in step c) is followed by calcining the dried mixture to produce the finished oligomerization catalyst. The mixture may here be heated in a suitable oven, preferably in an air stream, in a nitrogen stream or in a combination thereof. The air or nitrogen stream may be passed through in cocurrent or in countercurrent. The nitrogen stream may be added during calcining. The calcining temperature may be 400° C. to 800° C., preferably 450° C. to 750° C., more preferably 550° C. to 650° C. This temperature may be maintained over several hours, preferably 0.25 to 20 hours, more preferably 0.5 to 10 hours, before the granulated material is cooled.

EXAMPLES

Production of the Oligomerization Catalysts 1464 g of an aluminosilicate (Davicat® O 701), 293 g of a colloidal dispersion of silicon dioxide particles (Köstrosol 0830 AS) and 2240 g of a nickel source (NiHAC solution, nickel content approx. 12% by weight) were granulated in an intensive mixer. After this batch, two identical granulation batches were produced. The first batch afforded a total of 3765 g of wet granules. The yield of wet granules having a size of 1.00 to 3.15 mm was 77%. The second batch afforded 3782 g of wet granules; the yield of wet granules having a size of 1.0 to 3.15 mm was 73%. For the preparation of the two catalyst samples, the 1.0 to 3.15 mm fraction of the two granulation batches were mixed with one another. The TPV of aluminium silicate and binder together is in accordance with DIN66134 1.1 ml/g. The liquid component in the mixture is therefore 1.26 times the TPV.

Production of the Catalyst 1 with Hydrothermal Treatment (Inventive)

Hydrothermal Treatment

Nine 500 ml glass bottles were each filled with 200 g of the wet granules produced as described above and the bottles were close with a membrane lid. The bottles were placed in an air-circulation drying oven heated to 115° C. (from Vötsch VTU 60/60) with fresh air feed and left there for 6 h. The loss of mass over this time was 25%. After the treatment, 1300 g of granules were obtained.

Drying

After the hydrothermal treatment, the granules were dried at 115° C. for a period of 1 to 2 hours on a sieve tray in an air-circulation drying oven (from Vötsch VTU 60/60) with fresh air feed and remained in the oven overnight. The material was taken out of the oven after a total of 16 hours. The loss of mass was approx. 50% overall, the drying rate during drying having been higher than in the hydrothermal treatment.

Calcining

The granules were calcined in a reactor with nitrogen through-flow (GHSV=1000 h$^{-1}$). The reactor was heated from room temperature to 550° C. at a heating rate of 1 K/min. The temperature of 550° C. was maintained for 10 h. The heating was then switched off and the reactor allowed to cool. The cooling of the reactor also took place at a GHSV of 1000 h$^{-1}$, but in a gas stream of N$_2$ and approximately 5000 ppm air.

Production of the Catalyst 2 without Hydrothermal Treatment (Noninventive)

Drying 1800 g of the wet granules produced as described above were dried at 115° C. for a period of 1 to 2 hours on a sieve tray in an air-circulation drying oven (from Vötsch VTU 60/60) with fresh air feed and left in the oven overnight. The material was taken out of the oven after a total of 16 hours. The loss of mass was approx. 49% overall.

Calcining

The granules were calcined in a reactor with nitrogen through-flow (GHSV=1000 h$^{-1}$). The reactor was heated from room temperature to 550° C. at a heating rate of 1 K/min. The temperature of 550° C. was maintained for 10 h. The heating was then switched off and the reactor allowed to cool. The cooling of the reactor also took place at a GHSV of 1000 h$^{-1}$, but in a gas stream of N$_2$ and approximately 5000 ppm air.

Measurement of Particular Properties

The oligomerization catalysts thus obtained underwent tests both of strength and of their performance in the oligomerization.

Example 1—Determination of the BCS (Bulk Crush Strength)

A weighed portion of the catalyst under investigation is placed in a metal cylinder of defined dimensions. The bulk material is compressed by a plunger to which a varying force can be applied. The fines fractions formed at different pressures is sieved off and the total weight determined in each case. The breaking strength is defined as the pressure in MPa at which a fines fraction of 0.5% by weight arises. For the actual measurement, 20 ml of the sieved sample (>0.425 to <6 mm) is weighed to an accuracy of 0.1 g and transferred to the cylinder. Uniform dense packing of the sample is achieved by repeatedly slamming the cylinder down hard onto a solid surface. The sample was then covered with 5 ml of steel spheres and the plunger placed thereon to perform the measurement. The results of the measurement are shown in Table 1.

TABLE 1

Results of the BCS measurement

| Catalyst | BCS |
|---|---|
| 1 (inventive) | 1.2 MPa |
| 2 (noninventive) | 0.3 MPa |

It can be seen that the hydrothermal treatment makes it possible to obtain a considerably harder catalyst with higher BCS.

Example 2—Abrasion

A portion of the catalyst under investigation (approx. 100 g) is circulated in a special rotating drum (circulation apparatus in accordance with ASTM D 4058-96) under defined conditions (speed of rotation 60 min$^{-1}$; circulation time 30 min) and the resulting fines fraction separated (sieving time 5 min, amplitude 1.2 mm/g) by means of a test sieve (mesh size 0.850 mm, in accordance with DIN 4188 1977-10). The abrasion is determined by differential weighing of the formed bodies before and after circulation (based on ASTM D 4058-96, but without additionally calcining the material as in the method, so as to be able to perform a faster measurement with sufficient accuracy). The results are shown in Table 2: The abrasion is here thus the percent loss of mass.

TABLE 2

Results of the abrasion measurement

| Catalyst | Abrasion (% by weight) |
|---|---|
| 1 (inventive) | 1.1 |
| 2 (noninventive) | 15.2 |

It can be seen clearly that the hydrothermal treatment makes it possible to obtain a considerably harder catalyst.

Example 3—Use in the Oligomerization

About 350 g of the respective catalyst was in each case introduced into a metal tube having an internal diameter of 23 mm. Added in front of and behind the catalyst were glass beads having a diameter of 2 mm, which serve as a preheating and cooling phase. The oligomerization was carried out using a butene/butane mixture comprising 60% n-butenes at 30 bar and a loading of 4.5 g/h of butene per gram of catalyst, with the reaction temperature varied between 90° C. and 110° C. The products were analysed by gas chromatography in respect of the butene conversion and the linearity of the octenes.

Tables 3 and 4 show the conversions and selectivities achieved for catalyst 1 (inventive) and the noninventive catalyst 2 as a function of temperature. The discussion of the selectivity hereinbelow is based on the ISO index. The linearity of an oligomerization product/of the dimers formed is described by the ISO index and represents a value for the average number of methyl branches in the dimer. Thus (for butene as reactant, as in the present case), n-octenes for example contributes 0, methylheptenes contribute 1 and dimethylhexenes contribute 2 to the ISO index of a C$_8$ fraction. The lower the ISO index, the more linear the structure of the molecules in the respective fraction. The ISO index is calculated by the following general formula:

$$\frac{(\text{singly branched dimers (\% by weight)} + 2 \times \text{doubly branched dimers (\% by weight)})}{100}$$

TABLE 3

Conversions and selectivities in the oligomerization of butenes using catalyst 1
Loading (feed of C$_4$ olefins in g/h per unit mass of catalyst in g) as WHSV: 4.5 h$^{-1}$

| | Temperature | Conversion based on C$_4$ olefins | Selectivity ISO index |
|---|---|---|---|
| Catalyst 1 (inventive) | 90° C. | 48.7 | 0.96 |
| | 100° C. | 46.8 | 0.94 |
| | 110° C. | 45.6 | 0.93 |

TABLE 4

Conversions and selectivities in the oligomerization of butenes using catalyst 2
Loading (feed of C$_4$ olefins in g/h per unit mass of catalyst in g) as WHSV: 4.5 h$^{-1}$

| | Temperature | Conversion based on C$_4$ olefins | Selectivity ISO index |
|---|---|---|---|
| Catalyst 2 (noninventive) | 90° C. | 42.1 | 1.00 |
| | 100° C. | 40.0 | 0.99 |
| | 110° C. | 38.6 | 0.97 |

It can be seen that the hydrothermal treatment makes it possible to produce a catalyst that shows better catalyst performance. i.e. a higher conversion and a lower ISO index.

The invention claimed is:

1. A process for producing a nickel-containing oligomerization catalyst, the process comprising:
   a) producing a mixture comprising
      amorphous aluminium silicate that comprises 1% to 45% by weight of aluminium oxide and 55% to 99% by weight of silicon dioxide,
      optionally, an Al-containing and Si-free binder or an Al-free and Si-containing binder,
      a nickel source that comprises a nickel compound, and water,
      wherein a liquid component in the mixture is not more than 1.5 times a total pore volume (TPV) of the aluminium silicate and of the optional binder, the TPV being determined by nitrogen adsorption in accordance with DIN 66134;
   b) subjecting the mixture thus produced to a hydrothermal treatment, the hydrothermal treatment taking place at a temperature in a range from 75° C. to 180° C.;
   c) drying the mixture obtained in b), the drying rate in c) being higher than a drying rate in b); and
   d) calcining the mixture dried in c) to produce the oligomerization catalyst, wherein the drying rate in c) is at least twice as high as the drying rate in b).

2. The process according to claim 1, wherein the nickel compound is selected from the group consisting of nickel nitrate ($Ni(NO_3)_2$), nickel acetate ($Ni(ac)_2$), nickel acetylacetonate ($Ni(acac)_2$), nickel sulfate ($NiSO_4$), nickel citrate, and nickel carbonate ($NiCO_3$).

3. The process according to claim 1, wherein the mixture produced in a) comprises ammonia and the ammonia is added in a) as part of the nickel source or as an ammonia-water mixture.

4. The process according to claim 3, wherein an ammoniacal $Ni(CO_3)$ solution is the nickel source.

5. The process according to claim 1, wherein in a), an oxidic aluminium material is the Al-containing and Si-free binder or silicon dioxide is the Al-free and Si-containing binder.

6. The process according to claim 1, wherein in a), aluminium oxide, aluminium hydroxide, or aluminium oxide hydroxide is the Al-containing and Si-free binder.

7. The process according to claim 1, wherein the mixture produced in a) is subjected to a forming before the hydrothermal treatment in b).

8. The process according to claim 1, wherein the mixture subjected to a hydrothermal treatment in b) is subjected to a forming before the drying in c).

9. The process according to claim 1, wherein a duration of the hydrothermal treatment is in a range from one hour to 24 hours.

10. The process according to claim 1, wherein the hydrothermal treatment is carried out in an open or closed vessel.

11. The process according to claim 1, wherein the drying in c) takes place at a temperature in a range from 80 to 250° C.

12. The process according to claim 1, wherein the drying in c) is carried out such that a dried material obtained has a loss on drying (LOD) at 110° C. of not more than 10% by weight.

13. The process according to claim 1, wherein the calcining in d) is carried out at a temperature between 400° C. and 800° C.

14. The process according to claim 1, wherein the calcining in d) is carried out in an air stream, in a nitrogen stream, or in a combination thereof.

15. The process according to claim 1, wherein in a), the liquid component in the mixture is not more than 1.25 times the TPV of the aluminium silicate and of the optional binder.

16. The process according to claim 1, wherein the hydrothermal treatment in b) takes place at a temperature in a range from 80° C. to 150° C.

17. The process according to claim 7, wherein the forming is granulation, tableting, extrusion, or die pressing.

18. The process according to claim 8, wherein the forming is granulation, tableting, extrusion, or die pressing.

19. The process according to claim 11, wherein the drying in c) takes place at a temperature in a range from 100 to 220° C.

20. The process according to claim 1, wherein the hydrothermal treatment is carried out in a closed vessel.

* * * * *